(12) United States Patent
Volos et al.

(10) Patent No.: US 10,942,824 B2
(45) Date of Patent: Mar. 9, 2021

(54) PROGRAMMING MODEL AND FRAMEWORK FOR PROVIDING RESILIENT PARALLEL TASKS

(71) Applicant: HEWLETT PACKARD ENTERPRISE DEVELOPMENT LP, Houston, TX (US)

(72) Inventors: Haris Volos, Palo Alto, CA (US); Kimberly Keeton, San Francisco, CA (US); Sharad Singhal, Belmont, CA (US); Yupu Zhang, Palo Alto, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 144 days.

(21) Appl. No.: 16/153,833

(22) Filed: Oct. 8, 2018

(65) Prior Publication Data
US 2020/0110676 A1 Apr. 9, 2020

(51) Int. Cl.
*G06F 11/00* (2006.01)
*G06F 11/20* (2006.01)
(Continued)

(52) U.S. Cl.
CPC ........ *G06F 11/2043* (2013.01); *G06F 9/4881* (2013.01); *G06F 11/0709* (2013.01); *G06F 11/203* (2013.01)

(58) Field of Classification Search
CPC ............... G06F 11/0709; G06F 11/203; G06F 11/2043; G06F 9/4881
See application file for complete search history.

(56) References Cited

U.S. PATENT DOCUMENTS 7,565,651 B1 * 7/2009 Carey ................... G06F 9/4881
718/100
7,640,544 B2 * 12/2009 Flood .................. G06F 12/0276
707/999.202

(Continued)

OTHER PUBLICATIONS

Bindschaedler et al., "Rock You like a Hurricane: Taming Skew in Large Scale Analytics," Proc. EuroSys 2018, Apr. 23-26, 2018, 15 pages.

(Continued)

*Primary Examiner* — Elmira Mehrmanesh
(74) *Attorney, Agent, or Firm* — Hewlett Packard Enterprise Patent Department

(57) ABSTRACT

Exemplary embodiments herein describe programming models and frameworks for providing parallel and resilient tasks. Tasks are created in accordance with predetermined structures. Defined tasks are stored as data objects in a shared pool of memory that is made up of disaggregated memory communicatively coupled via a high performance interconnect that supports atomic operations as descried herein. Heterogeneous compute nodes are configured to execute tasks stored in the shared memory. When compute nodes fail, they do not impact the shared memory, the tasks or other data stored in the shared memory, or the other non-failing compute nodes. The non-failing compute nodes can take on the responsibility of executing tasks owned by other compute nodes, including tasks of a compute node that fails, without needing a centralized manager or schedule to re-assign those tasks. Task processing can therefore be performed in parallel and without impact from node failures.

20 Claims, 6 Drawing Sheets

(51) Int. Cl.
*G06F 11/07* (2006.01)
*G06F 9/48* (2006.01)

(56) References Cited

U.S. PATENT DOCUMENTS

| | | | | |
|---|---|---|---|---|
| 7,694,306 | B2* | 4/2010 | Minor | G06F 9/5044 |
| | | | | 717/151 |
| 8,914,805 | B2* | 12/2014 | Krishnamurthy | G06F 9/4881 |
| | | | | 718/105 |
| 9,329,899 | B2* | 5/2016 | Ailamaki | G06F 9/4843 |
| 9,594,696 | B1* | 3/2017 | Braverman | G06F 9/4843 |
| 9,760,408 | B2* | 9/2017 | Beale | G06F 16/13 |
| 2009/0064168 | A1* | 3/2009 | Arimilli | G06F 9/522 |
| | | | | 718/105 |
| 2012/0054771 | A1 | 3/2012 | Krishnamurthy et al. | |
| 2013/0290643 | A1 | 10/2013 | Lim et al. | |
| 2014/0201409 | A1 | 7/2014 | Dalal et al. | |
| 2016/0092992 | A1* | 3/2016 | Himmighoefer | |
| | | | | G06F 16/24532 |
| | | | | 705/30 |
| 2016/0117129 | A1 | 4/2016 | Shrader et al. | |
| 2016/0283303 | A1* | 9/2016 | Sharma | G06F 11/0772 |
| 2017/0295108 | A1* | 10/2017 | Mahindru | H04L 47/805 |
| 2018/0081709 | A1* | 3/2018 | Okazaki | G06F 9/461 |
| 2020/0099592 | A1* | 3/2020 | Mahindru | G06F 11/3006 |

OTHER PUBLICATIONS

Blumofe et al., "Cilk: An Efficient Multithreaded Runtime System", Proc. PPoPP'95, Jul. 19-21, 1995, 11 pages.

Cunningham et al., "Resilient X10: Efficient failure-aware programming", Proc. PPoPP 2014, Feb. 15-19, 2014, 41 pages.

M. Zaharia, et al. "Resilient Distributed Datasets: A Fault-Tolerant Abstraction for In-Memory Cluster Computing," Proc. NSDI 2012, Apr. 25-27, 2012, 14 pages.

Venkataraman et al., "Drizzle: Fast and Adaptable Stream Processing at Scale," Proc. SOSP 2017, Oct. 28, 2017, 16 pages.

Wikipedia, "Data lineage", available online at <https://en.wikipedia.org/w/index.php?title=Data_lineage&oldid=849767742>, Jul. 11, 2018, 13 pages.

Wikipedia, "Slurm Workload Manager" available online at <https://en.wikipedia.org/w/index.php?title=Slurm_Workload_Manager&oldid=858900716>, Sep. 10, 2018, 5 pages.

Pramod Subba Rao and George Porter, "Is Memory Disaggregation Feasible?: A Case Study with Spark SQL," Mar. 2016, pp. 75-80, ACM.

Sangjin Han et al., "Network Support for Resource Disaggregation in Next-generation Datacenters," Nov. 2013, pp. 1-7, ACM.

* cited by examiner

PROGRAMMING MODEL AND FRAMEWORK FOR PROVIDING RESILIENT PARALLEL TASKS

BACKGROUND

High-performance computing (HPC) systems and cluster systems refer to a collection of interconnected computers or computing devices commonly referred to as nodes or computing nodes. These computing nodes are configured to work together to more efficiently perform jobs. To this end, the systems include parallel processing capabilities that enable nodes to perform tasks of a job at the same time.

BRIEF DESCRIPTION OF THE DRAWINGS

Certain examples are described in the following detailed description and in reference to the drawings, in which.

DETAILED DESCRIPTION

Figure 1:
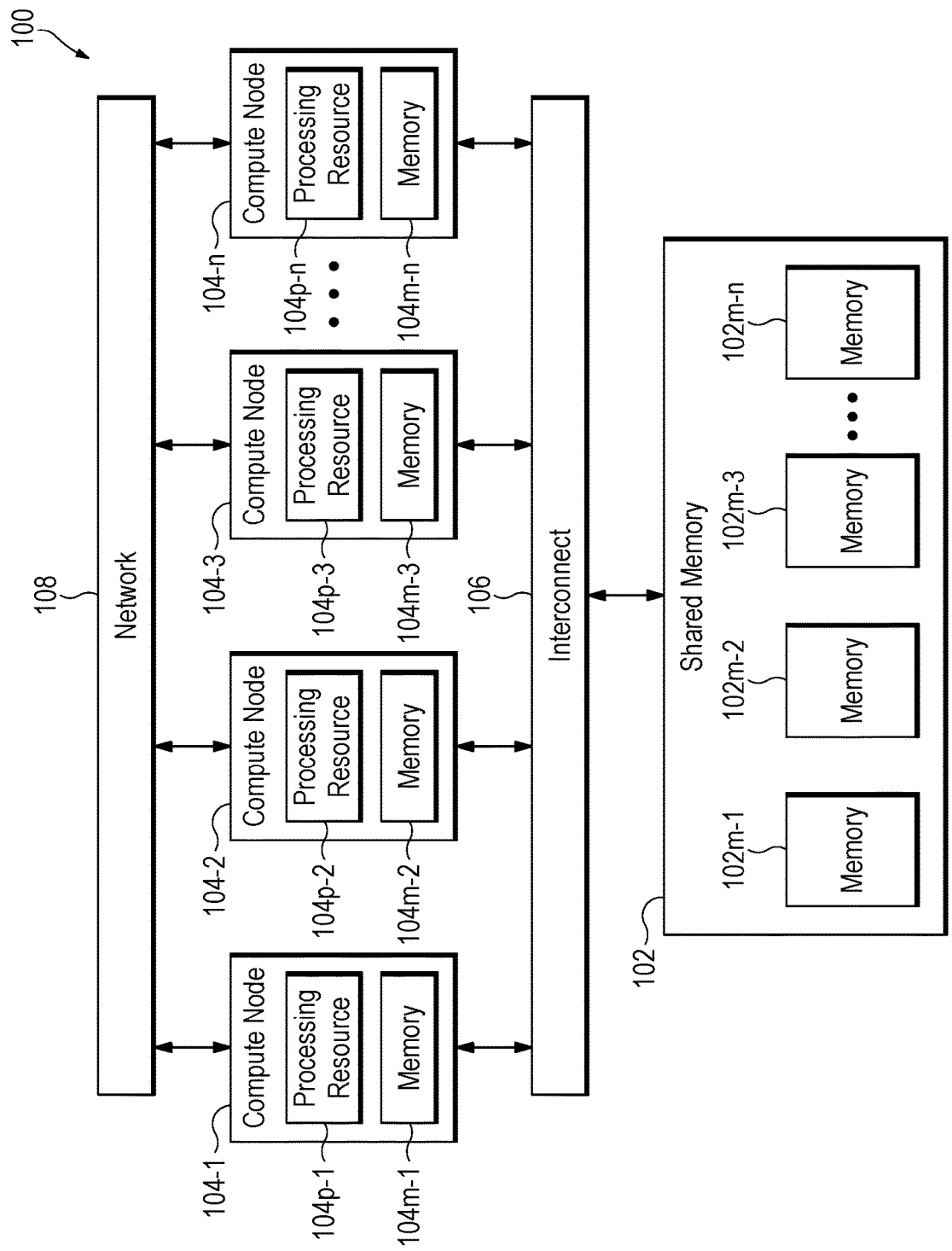
FIG. 1 is a diagram illustrating an exemplary embodiment of a computing environment.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

Traditionally, computing systems or architectures such as high-performance computing (HPC) systems or cluster systems are made up of multiple or a large number of computers or computing devices commonly referred to as "nodes." These nodes are interconnected and configured to work together to perform a job. A job can be defined as or partitioned into multiple tasks, which can be performed by nodes in parallel.

Clustering of nodes is designed to decrease the amount of time to complete a computing job by distributing the tasks of a job to nodes that can process them in parallel. However, distributing computations to many nodes also increases the number of potential points of failure. When a node fails, it is often necessary for the node to be restarted and for the task being processed by that node to be re-processed, thereby resulting in wasted work and resources. Due to these and other complexities of clustering nodes, computer clusters include a centralized management system. These centralized management systems are commonly employed to make the clusters available for use, handle scheduling of tasks among the nodes, and address node failures.

Traditionally, node failures are addressed using approaches such as checkpointing, logging, and lineage tracking, which create records that can be used in the event of a failure. However, these approaches are inefficient and create large amounts of overhead by requiring substantial amounts of time to create those records, recover the nodes based on the records, and store large amounts of additional data. In addition, there can often be a lag between when a node is checkpointed, logged, or tracked, and when the failure occurs, resulting in at least some forfeited work. Moreover, these traditional approaches for handling node failures require the use of a centralized manager or scheduler to store the data for the failure recovery and to coordinate the recovery. Notably, these centralized management systems, which are implemented to deal with node failures, can themselves be the point of failure, thereby obviating their use.

There is a need, therefore, for systems and techniques for providing parallel and resilient tasks in a computing environment or architecture made up of a large number of interconnected computing resources. These tasks should be deployable in a fabric-attached memory architecture and executed by compute nodes that share a large memory pool of disaggregated memory relative to the compute nodes. Moreover, failure of the compute nodes should be tolerated and resolved without relying on a centralized system that can itself fail. That is, the embodiments described herein provide fault tolerance, in part, by virtue of the independent failure domains of shared memory and compute nodes.

Accordingly, described herein are exemplary embodiments of programming models and frameworks for providing parallel and resilient task execution. In some embodiments, computer applications are programmed according to specifications for defining tasks, which together make up a computer application. These tasks are defined and stored in a shared pool of memory, interconnected via a memory-semantic fabric. The shared pool of memory is directly accessible by worker processes run by compute nodes. The worker processes can execute the tasks that are defined and stored in the memory fabric. The compute nodes and memory are configured such that their failures are independent of one another, meaning that the availability of data stored in memory is not affected by the failure of a compute node. In this way, when a compute node, in which a worker process executing one or more tasks fails, the task or tasks are not affected and can instead be executed by another, non-failing worker process, using work sharing and work stealing techniques. These and other aspects of exemplary embodiments are now described in detail.

Resilient Parallel Task Programming Model and Framework

FIG. 1 is a system diagram illustrating an exemplary embodiment of a computing environment 100 for providing resilient and parallel task execution. As described herein, task execution can be performed by compute nodes that share data among each other using a pool of memory. More specifically, as illustrated in FIG. 1, the computing environment includes a shared memory 102 that is shared by compute nodes 104-1, 104-2, 104-3, . . . , and 104-*n* (collectively "compute nodes" and/or "104"). It should be understood that although four compute nodes 104 are shown in FIG. 1, the environment 100 can include any number of compute nodes. Each of the compute nodes 104 can be or include a desktop computer, laptop (or notebook) computer, workstation, tablet computer, smart device, switch, router, server, blade enclosure, or any other processing device or equipment.

Each of the compute nodes 104 includes various types of interconnected hardware known to those of skill in the art, including processing resources and memory. For instance, as illustrated, compute nodes 104-1, 104-2, 104-3, . . . , and 104-*n* includes processing resources 104*p*-1, 104*p*-2, 104*p*-3, . . . , and 104*p*-*n* (collectively "processing resources" and/or "104*p*"), respectively, and memory 104*m*-1, 104*m*-2, 104*m*-3, . . . , and 104*m*-*n* (collectively "memories" and/or "104*m*"), respectively. As used herein, the processing resources 104*p* may include one processor, multiple processors, one or more cores of a multi-core processor, and any other hardware processing circuit. In some embodiments, the processors can be at least one of a central processing unit (CPU), a semiconductor-based microprocessor, a graphics processing unit (GPU), and/or a field-programmable gate array (FPGA). As described below in further detail, the compute nodes 104 can execute code (e.g., program code, computing code, machine-readable instructions) that are part of or form computing applications, programs, software, firmware and the like. Although not shown in FIG. 1, as described below, each of the compute nodes 104 can include one or more worker processes (or "workers"), which are processes that can share the resources of the compute node (e.g., processor, memory) and can run in parallel to perform or execute tasks (e.g., execute code, read and write data to shared memory).

As used herein, each memory 104*m* of the compute nodes can refer to all or portions of one or more memory media (e.g., a machine-readable storage medium), devices, or any electronic, magnetic, or other physical storage apparatus configured to store information such as instructions, data and the like. Each memory 104*m* includes volatile memory (e.g., dynamic random-access memory (DRAM)). In some embodiments, each memory 104*m* can include non-volatile memory (e.g., read-only memory (ROM), flash memory, memristor memory, spin-transfer torque memory, and the like).

Still with reference to FIG. 1, each of the compute nodes 104 can communicate with one another via a network 108, which can be or include one or more networks of varying types. Non-limiting examples of the network 108 include Internet, Local Area Network (LAN), Wide Area Network (WAN), etc., and/or dedicated or shared communication links, lines, buses, or memory fabric.

As shown in FIG. 1, the compute nodes 104 are communicatively coupled to and configured to communicate with the shared memory 102 via interconnect 106. In some embodiments, the interconnect 106 is or includes a high-performance and scalable networks or network topologies such as a bus, fabric and others known to those of skill in the art that enable the functionality described herein, including the use of atomic operations. In some embodiments, the interconnect 106 can be a memory-semantic interconnect and/or remote direct memory access (RDMA)-based networks that support atomic operations over, for example, Ethernet or InfiniBand. That is, the interconnect 106 enables the use of atomic operations, thereby allowing applications to perform operations, such as write, compare-and-swap (CAS), or fetch-and-add, atomically on the shared memory 102. Atomic operations work in an "all-or-nothing" fashion, such that the operation appears to complete in a single step. For example, an atomic store operation on a shared variable in shared memory is not visible to other processes or threads when it is partially complete; rather, it is only visible when fully complete. Atomic operations allow applications to update data structures in a controlled fashion.

The shared memory 102, with which the compute nodes 104 communicate via the interconnect 106, is a pool or collection of memory of one or more memory devices, or portions thereof. In some embodiments, as shown in FIG. 1, the shared memory 102 can include 102*m*-1, 102*m*-2, 102*m*-3, . . . , and 102*m*-*n* (collectively "memories," and/or "102*m*"). It should be understood that the shared memory 102 can include any number of memories and/or memory devices, and can be volatile or non-volatile memory. The non-volatile memory can be, for example, read-only memory (ROM), flash memory, memristor memory, spin-transfer torque memory, and the like. The shared memory can be accessed by any of the compute nodes or worker processes without active involvement (e.g., routing, processing) by other compute nodes or worker processes. In some embodiments, the shared memory can be byte-addressable, meaning that each of the compute nodes 104 can communicate with (e.g., issue a memory command to) any location or byte in the shared memory 102, without the need for active involvement from other compute nodes. In some embodiments, the shared memory 102 is deemed to be remote (e.g., not local) to all of the compute nodes 104, such that access to the shared memory 102 by the compute nodes 104 the same for all of the nodes.

In some embodiments, the shared memory 102 is said to be disaggregated, meaning that at least a portion of memories 102*m* and/or corresponding memory devices are physically separate (e.g., separately housed) from the compute nodes 104, though, as described above, communicatively coupled via the interconnect 106. In some embodiments, the shared memory 102 is referred to as "fabric-attached memory" (FAM), meaning that the memory devices are attached via a fabric, such as the interconnect 106, which supports atomic operations.

It should be understood that, in a FAM environment such as the one described in FIG. 1, the shared memory 102 is shared by the compute nodes 104, which are heterogeneous and decentralized nodes. The compute nodes 104 are configured so that they fail independently of the shared memory 102, thereby providing a partial failure model. That is, if one of the compute nodes 104 fails, any updates propagated to the shared memory 102 prior to the failure remain visible and accessible to the other compute nodes 104. As described in further detail below, the environment 100 enables a programming model and framework for defining and executing tasks resiliently and optimizing failure recovery.

Figure 2:
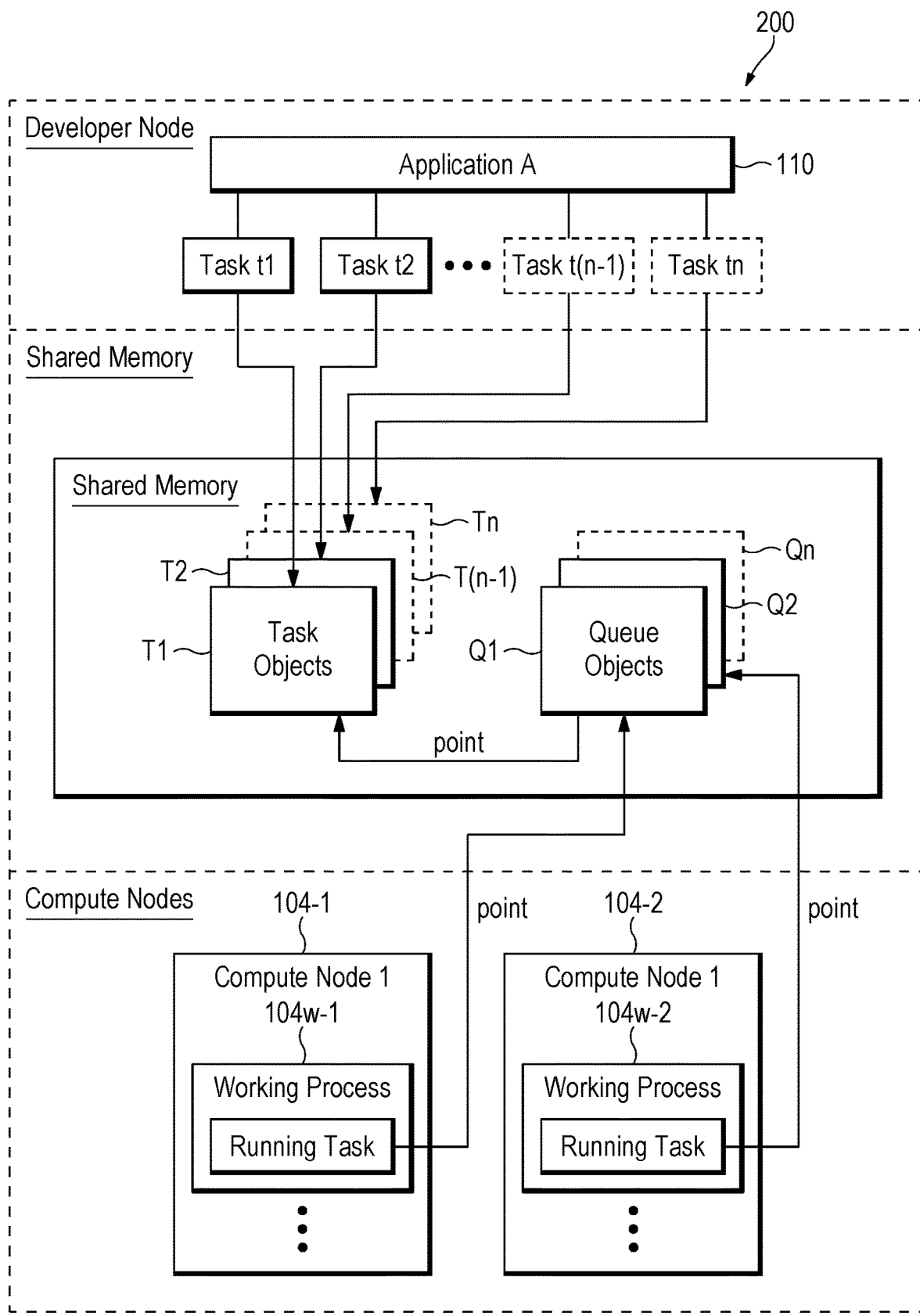
FIG. 2 is a diagram illustrating exemplary aspects of defining and executing tasks in the computing environment FIG. 1.

FIG. 2 is a diagram 200 illustrating exemplary aspects of defining and executing tasks in the computing environment 100 of FIG. 1. As described above with reference to FIG. 1, the compute nodes 104 are configured to execute code of tasks that correspond to a computing application. An application A (110) is illustrated in FIG. 2. The application A is shown with reference to a developer node. The developer node refers to a computing device or the like on which the application A is programmed. Of course, as known to those of skill in the art, the application A can be programmed using multiple computing devices. Nonetheless, for purposes of simplicity and illustration, in FIG. 2, application A is programmed using a single developer node. In some embodiments, the developer node can be one of the compute nodes 104 illustrated in FIG. 1.

Still with reference to FIG. 2, as illustrated, the programmed application A is made up of multiple tasks. For purposes of illustration, in FIG. 2, the application A is made up of two tasks, tasks t1 and t2. Nonetheless, it should be understood that applications can be made up of any number of tasks such as tasks t1, t2, . . . , t(n−1) and tn. That is, a programmer can control the granularity of tasks of an application, meaning that an application can be composed of a few broad tasks or many narrow tasks. Although not illustrated in FIG. 2, in some embodiments, an application can be composed of one or more jobs, each of which is made up of one or more tasks.

In some embodiments, the application 110 is programmed in accordance with a particular programming model that provides an application programming interface (API). The specification of the API provides definitions of routines, tools and protocols for creating resilient parallel tasks. In some embodiments, the API includes a task data structure. Programmers can therefore define each task (e.g., t1, t2) accordingly, including at least code for functions to be performed, shared memory inputs and outputs, and parameters to be used.

As described in further detail below, in some embodiments, the programming model requires that each of the tasks be programmed to be idempotent, such that tasks can transparently be rerun if they fail (e.g., as a result of their corresponding worker process or compute node failing). Tasks can be programmed to be idempotent using techniques known to those of skill in the art, including processing over immutable data, multi-versioning, copy-on-write, and the like.

Moreover, as also described in further detail below with reference to FIG. 4, the present programming model enables applications to be programmed with dynamic task graphs that use a spawn primitive. Spawning allows a parent task to spawn children tasks that execute asynchronously and in parallel (e.g., a taskset) with the parent. Moreover, spawning can be used to issue a continuation task that is dependent on preceding tasks in the dynamic task graph.

Still with reference to FIG. 2, the task code generated by the developer node for the tasks that make up the application A is serialized and stored in the shared memory 102 for subsequent execution by the compute nodes 104. That is, as shown in FIG. 2, task objects that define each of the tasks that make up application A are stored in the shared memory 102. For instance, a task object T1 that defines the task t1 and a task object T2 that defines the task t2 are stored in the shared memory 102. For exemplary purposes, task objects T(n−1) and Tn, which correspond to tasks t(n−1) and tn that can also make up any application, are illustrated in FIG. 2. It should be understood that, in some embodiments described herein, "tasks" and "task objects" are used interchangeably herein to refer to information (e.g., code, dependencies, etc.) describing or associated with defined subsets of a computing application.

Each task object (e.g., T1, T2) can include a taskset identifier (ID), a task ID, a status, dependencies, and the code generated during the programming of the application, which indicates the functions, inputs and outputs, and parameters of the task. Task objects and their contents are described in further detail below with reference to FIG. 3A.

As shown in FIG. 2, the shared memory also stores queue objects, including queue objects Q1, Q2, . . . , Qn. In some embodiments, each of the queue objects includes a queue ID, worker process ID, and the queue data structure that includes the container of data elements. Queue objects and their contents are described in further detail below with reference to FIG. 3A. Nonetheless, for clarity, it should be understood that the queue data structures include one or more task objects, which are queued for processing by respective compute nodes 104. In some embodiments, task objects are said to be added or placed in a queue by virtue of a pointer to the task object being added or placed in the queue (e.g., as illustrated by the exemplary arrow from Q1 to T1).

Each of the queues or queue objects (e.g., Q1, Q2) is assigned to or associated with a worker or worker process. Worker processes are processes that can execute in parallel and are configured to handle the execution of tasks, including running the task code, reading inputs from the shared memory, reading parameters, writing results of the processing of the task code to the shared memory. As shown in FIG. 2, in some exemplary embodiments, the compute nodes 104-1 and 104-2 include respective worker processes 104w-1 and 104w-2. It should be understood however that each compute node can include one or more worker processes, which can operate in parallel with one another. Worker processes have or are associated with corresponding worker process IDs. Thus, a queue object is considered to be assigned to a worker process as indicated by the worker process ID included in the queue object. As described in further detail below, in some embodiments, a work sharing model or framework can be provided, in which the shared memory 102 stores a single queue of task objects that can be accessed by all worker processes, rather than one queue for each of the worker processes.

Still with reference to FIG. 2, each worker process is associated with a running task or running task slot, which can be stored in the shared memory 102. The running task slot refers to or includes a reference or pointer to a task (or task object) assigned to that worker process. As described in further detail below (e.g., with reference to FIG. 3A), a task object can be moved from a worker process' queue to its running task slot when it is executed (or as it is being prepared to be executed). More specifically, for instance, the worker process 104w-1 is associated with a running task slot rt1 stored in the shared memory 102. As described above, a queue object, which includes a queue of tasks for execution, is associated with or assigned to each worker process—e.g., queue object Q1 is associated with the worker process 104w-1. The running task slot rt1 of the worker process 104w-1 is therefore configured such that a pointer to a task object is copied from the queue object Q1 into the running task slot rt1 when worker process is executing or preparing to execute that task. In this way, the running task slot indicates the most recent task being executed by a worker process, and can therefore indicate where recovery needs to occur if the worker process fails.

It should be understood that storage of the task objects, queue objects, and running task slot in the shared memory allow for the information therein to remain available even if worker processes or compute nodes associated with those task objects, queue objects, or running task slots fail. In this way, tasks are therefore said to be resilient because those tasks can be performed by other worker processes or compute nodes without impact in the event of a failure.

Figure 3A:
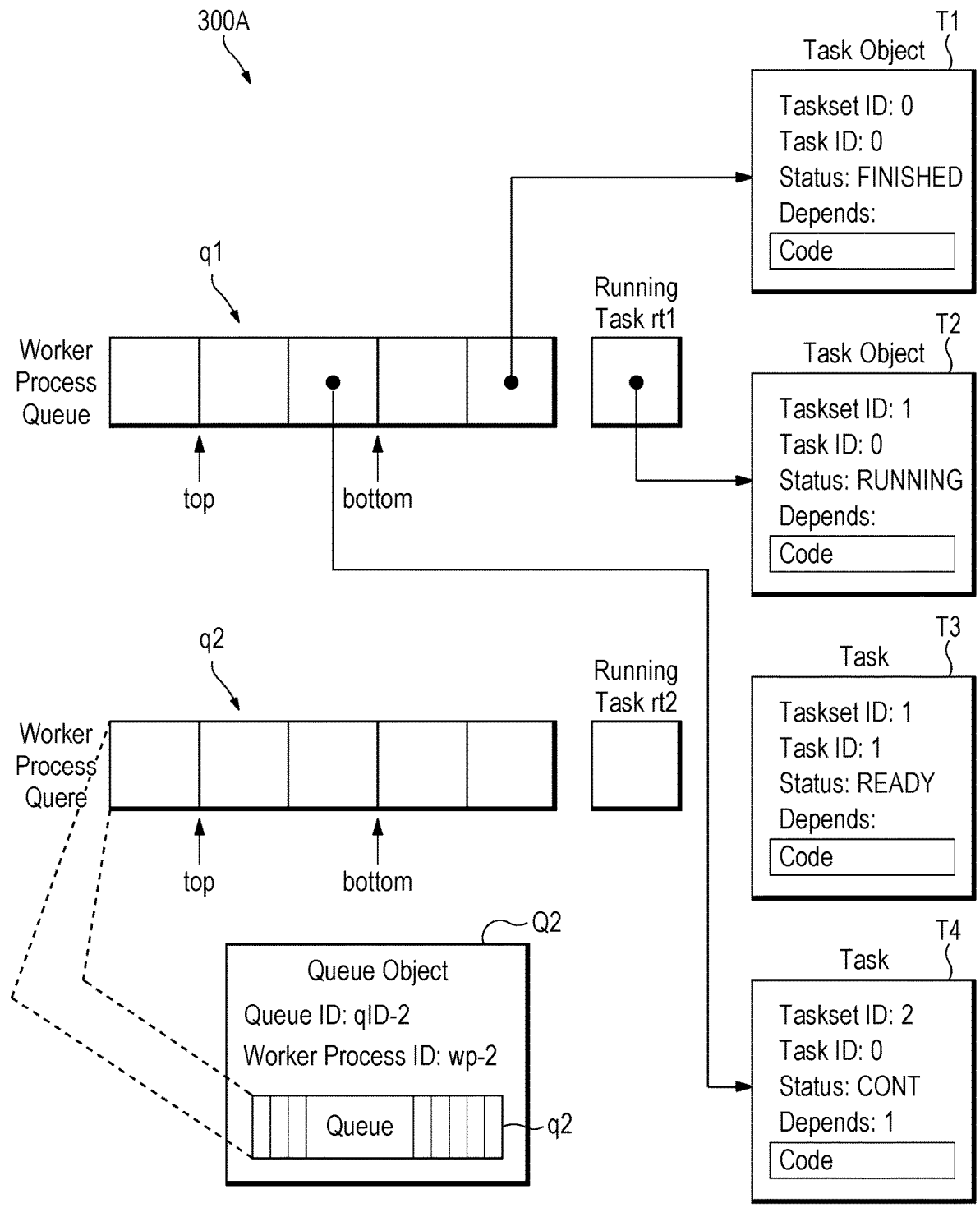
FIG. 3A is a diagram illustrating exemplary aspects of the associations and/or correspondences among task objects, tasks, queue objects and queues, according to an exemplary embodiment.

FIG. 3A is a diagram 300A illustrating exemplary aspects of the associations and/or correspondences among task objects, tasks, queue objects and queues, according to an exemplary embodiment. In FIG. 3A, four task objects are illustrated: T1, T2, T3 and T4. These task objects define tasks that, in one embodiment, make up a computer application. Each of the task objects T1 to T4 include or are made up of information including a taskset ID, task ID, status, dependencies and the code of the task (e.g., functions, inputs, outputs, parameters).

As described above, a group of tasks of an application that can run in parallel can be referred to as a taskset. The tasks that make up an application can therefore, in some embodiments, be grouped into tasksets. Tasksets, including related concepts such as spawning, dependencies, and continuation tasks, are described in further detail below with reference to FIG. 4. Nonetheless, it should be understood that, when tasks are grouped into tasksets, a taskset ID of the taskset with which a task is associated is stored in each of the task objects.

Figure 3B:
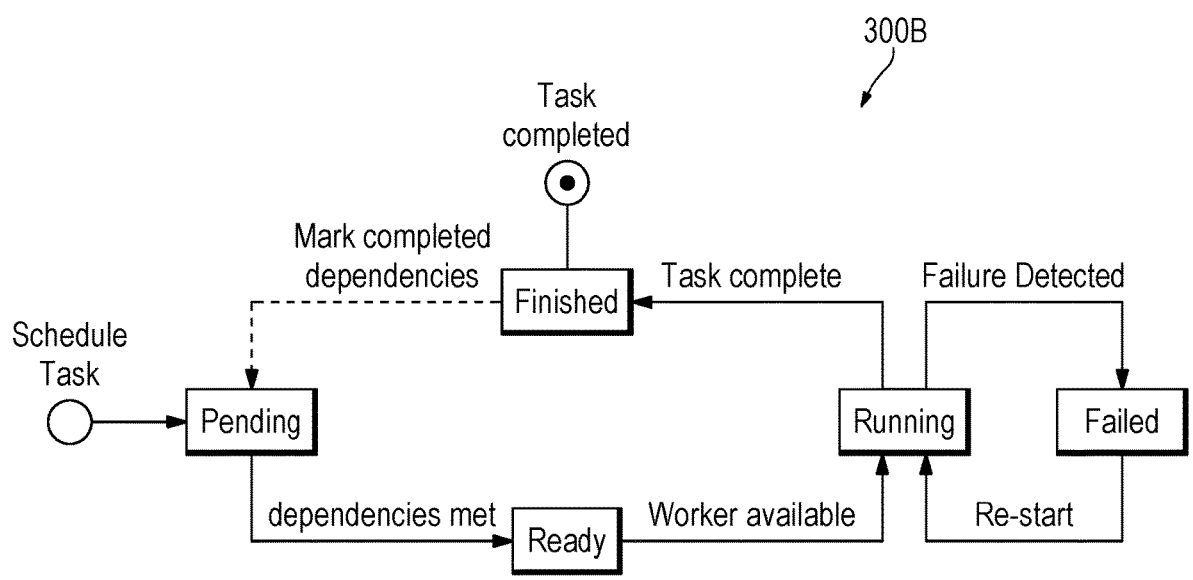
FIG. 3B is a diagram illustrating an exemplary embodiment of a state cycle of a task represented by a task object.

The task IDs stored in each of the task objects (e.g., T1 to T4) are unique identifiers of the respective tasks defined by the task objects. The task ID of a task object can be globally unique, meaning that it is unique for all tasks associated with or defining an application; or can be unique within a taskset. The status stored in each of the task objects is a unique code or identifier indicating a real-time or most recent state of the processing of the respective task. FIG. 3B is a diagram 300B illustrating an exemplary embodiment of a state cycle of a task represented by a task object (e.g., T1 to T4), from which the status field in a task object can be populated.

It should be understood that aspects of concepts mentioned in FIG. 3B are described in further detail below, particularly with reference to FIGS. 3A, 4 and 5. Nonetheless, some aspects are now described with reference to FIG. 3B. In FIG. 3B, a task can refer to a task (e.g., the task code generated when programming the application) and/or its task object representation. As illustrated, a task is initially scheduled, meaning that it is assigned or added to a queue for execution by a worker process. Upon being assigned to a queue, the state of the task (as stored in its respective task object) is set to PENDING. In some embodiments, the PENDING state can be a default state of a task when a task object is created. Moreover, it should be understood that the state of tasks is changed by the respective worker process as part of its handling of task objects. In some embodiments, the state of a task in a task object can be changed using, for example, atomic swap (or RDLK, XCHG) or compare-and-swap operations.

In turn, the state of the task is changed or switched to READY when the dependencies of the task have been met or satisfied. In some embodiments, as described in further detail below, this means that dependencies such as expected inputs that the task depends on for processing are ready or available for consumption or use by the task. When a worker process is ready for, begins or triggers executing of the task, the state of the task is changed to RUNNING (or, in some embodiments, to EXECUTING, which is used interchangeably). In some embodiments, the state of the task—i.e., the state stored in the corresponding task object stored in the shared memory—can be attempted to be changed to RUNNING by multiple worker processes, but only one of those worker processes can successfully cause the change. In some embodiments, a task is ready to run or begins running when the worker process calls its method (e.g., run task( ) with the appropriate parameters. As described in further detail below with reference to FIGS. 3B, 4 and 5, a compare-and-swap operation can be used to ensure that only one worker can change the status of a task from READY to RUNNING.

Still with reference to FIG. 3B, while the task is being executed—e.g., it is in a RUNNING state—the task or execution of the task can fail. In some embodiments, the state of the task can be changed from RUNNING to FAILED, and can be returned to a RUNNING state by being re-started or re-executed by the same or another worker process, as described in further detail below. In some embodiments, the task or execution of the task can fail due to a failure of its worker process and/or the compute node of the worker process. In such cases in which the task or executing the task fails in a way where updating of its status in the task object is not possible or feasible (e.g., the worker process or compute node fails and is therefore not operable to communicate with the shared memory where the task object is stored), the state of task is not or cannot be changed from RUNNING to FAILED. The task therefore remains in a RUNNING state, despite the fact that it is not actually being executed by the worker process at that time. In some embodiments, such failures can be identified by other worker processes or compute nodes. For example, worker processes can at predetermined times or intervals reach out to other worker processes and check whether they have tasks in their queues that need to be processed and/or are processing tasks on which one or other tasks depend on (e.g., continuation task) before proceeding. In such cases, as explained below, a worker process can steal or attempt to steal one or more of those tasks to execute, thereby, in some instances, enabling tasks dependent thereon to proceed.

It should be understood that the states illustrated in FIG. 3B show the state or status of a task at a given instance in time. The states of a task shown in FIG. 3B are independent of the worker process or compute node assigned to or executing the task. That is, a task can only be in one state at a given time—and the fact that multiple worker processes can be attempting to manage or execute a task does not change that condition. For instance, although not illustrated in FIG. 3B but is described in further detail below, a task in READY or RUNNING state can be assigned to, ready to be executed, or being executed by one worker process, and while in that same state or transitioning to another state, become associated with (e.g., assigned to, ready for execution, or being executed by) another one of the worker processes through work stealing. For example, a task in a RUNNING state, being executed by a first worker process, can have failed (but, as described above, not have had its state changed to FAILED). In turn, a second worker process different than the first worker process can "steal" that task, meaning that it takes over or assume the execution of the task by running (e.g., re-running) it using its own resources.

In any event, once the task has been completed, the state of the task is changed to FINISHED. In some embodiments, a task can be deemed to be completed when the task returns a normal exit status. Moreover, as shown in FIG. 3B, in connection with or as a result of a task being completed, the dependencies defined in the corresponding task object stored in the shared memory can be updated. The dependencies can be (1) data dependencies, meaning that the inputs of one task are dependent on the outputs of another task; and/or (2) control dependencies, meaning that one task is dependent on one or more other tasks reaching a particular point in the logic, or waiting for one or more other tasks to produce a particular output value. For example, if a task consists of taking input data, modifying it (e.g., adding, changing, removing), and outputting the modified data or another resulting data, that output data which depends on the task and can be stored in the shared memory is caused to be updated therein.

Returning to FIG. 3A, in addition to the taskset ID, task ID, and status, the task objects T1 to T4 can also include dependence information (labeled as "depends" in FIG. 3A). In some embodiments, the dependence information of a task object indicates whether that task depends on one or more tasks. In some embodiments, the dependency information stored in a task object can identify those tasks (or tasksets) on which the task depends, using unique identifiers, pointers, or the like. The dependence information can be used to locate those tasks on which a task depends and check their status to determine whether and/or when those tasks have been completed, such that the dependent task can be executed. Dependencies between tasks can be seen in the diagram of FIG. 4.

Figure 4:
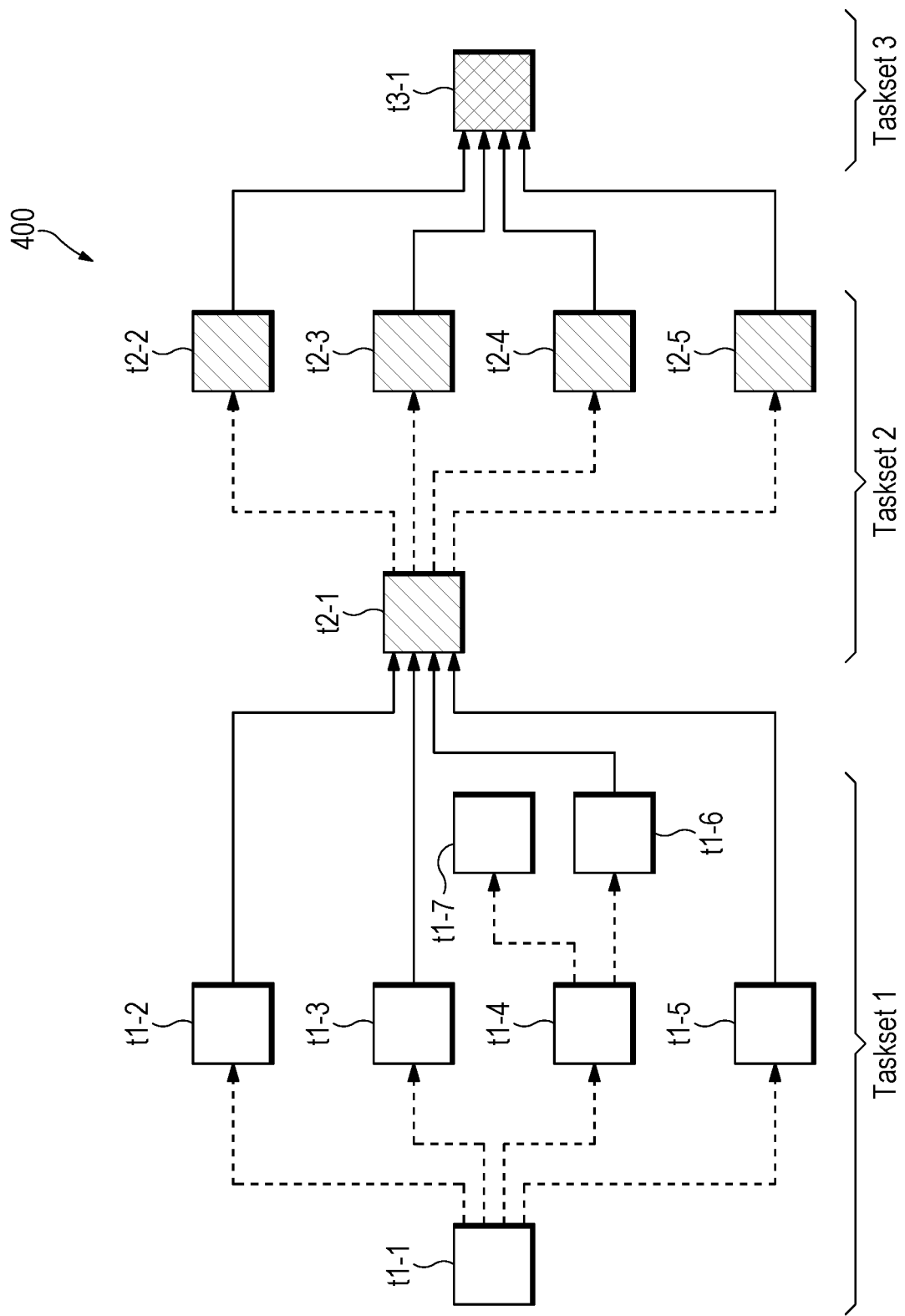
FIG. 4 is a diagram illustrating an exemplary embodiment of a dynamic task graph.

FIG. 4 illustrates an exemplary embodiment of a dynamic task graph 400. A dynamic task graph can be constructed by a programmer and/or can represent code of a computer application. In some embodiments, dynamic task graphs illustrate the concept of spawning or the spawn primitive, which can be used by a parent task to create (i.e., spawn) new child processes (i.e., sub-processes); or can be used to create continuation tasks that can be executed only after all other tasks in the taskset finish being executed.

For instance, in FIG. 4, a number of tasks, including parent tasks, child tasks, and continuation tasks, are illustrated. It should be understood that the tasks can be created or defined at the time of programming. In other instances, some tasks can be defined at the time of programming, while other tasks can be created or spawned at runtime, e.g., when a task being executed calls a function to spawn children tasks and/or continuation tasks. In some embodiments, the programming model and framework described herein treats or defines all tasks (e.g., parent, child, continuation) in the same way, simply as a task. Their characterization as a parent, child or continuation task can be ascertained from the dependency information stored in the task object.

The tasks of the dynamic graph 400 are grouped into tasksets: taskset 1, taskset 2 and taskset 3. As described above, a taskset is a group of tasks that can be executed fully or partially in parallel. For purposes of illustration, the tasks in FIG. 4 are labeled as t1-1, t1-2, etc., in which the first number is an identifier of the task's taskset and the second number is an identifier of the task. Thus, task 1-2 is task 2 in taskset 1. It should be understood that the numbering of the task does not necessarily indicate any order or sequence of execution thereamong. The tasks of the graph 400 are connected via arrows, with dashed arrows indicating dynamic spawning of one task into one or more child tasks, and solid arrows indicating pre-defined or static dependencies between tasks. Thus, for example, in FIG. 4, task t1-1 spawns into four tasks t1-2, t1-3, t1-4 and t1-5; and task t2-1, although not spawned by any other task, depends on tasks t1-2, t1-3, t1-5 and t1-6. This means that, in some embodiments, task t2-1 cannot proceed until tasks t1-2, t1-3, t1-5 and t1-6, because their processing and/or outputs may be required to be used by the task t2-1. Thus, for purposes of illustration, a task object of task t2-1 could include information (e.g., pointer, task ID) of the tasks on which it depends (i.e., t1-2, t1-3, t1-5 and t1-5). As described in further detail below, the present model and framework enable dependencies of tasks to be enforced in the execution of parallel and resilient tasks.

Returning to FIG. 3A, lastly, the task objects T1 include code, referring to the code used to define the respective tasks when programming an application. The code can include task definitions, functions, inputs, outputs, parameters and the like. In some embodiments, the programming model described herein enables coding based on tasking or task execution, for example, using specifically designed task data structures, task execution functions, and the like. As described in further detail below, the code of a task refers to what is actually executed by a worker process when executing or running a task. It should be understood that the task objects T1-T4 shown in FIG. 3A are non-exhaustive and shown for purposes of illustration. Moreover, their labeling as T1, T2, etc., does not indicate any order or sequence thereamong.

The task objects (e.g., T1-T4) are, at one point, assigned or added to a queue owned or corresponding to a worker process. FIG. 3A further illustrates two queues, namely q1 and q2, that are assigned to worker processes. The queues are stored in or made up of portions of a shared memory (e.g., shared memory 102). As described in further detail below, each queue corresponds to and/or is defined by a queue object (e.g., queue object Q2) stored in the shared memory. In some embodiments, the queues can be implemented as a Chase-Lev lock free circular-array deque. Each slot or index of the queue stores a pointer to a task object. For instance, in FIG. 3A, the queue q1 stores a pointer to the task object T1, T4, etc. It should be understood that although only two pointers are illustrated for queue q1 in FIG. 3A, each of the slots in the queue includes a pointer to a task object (some of which are not illustrated).

In some embodiments, a worker process assigned to or owning a queue pulls tasks to execute from one end, and adds new tasks (e.g., spawned tasks) one end. In some embodiments, spawned tasks can be added or assigned to other worker processes using work sharing techniques described herein in further detail. As known to those of skill in the art, adding tasks to the queue can refer to the process of inserting or copying, into a slot in the queue, a pointer element pointing to a task object. As described below, in some embodiments, tasks can be stolen by other worker processes from one end of the queue, and tasks can be added and consumed from the other end of the queue. Still with reference to FIG. 3A, the "ends" of the queue, where tasks are consumed from or added, can be defined using a top index ("top") and a bottom index ("bottom") that can be advanced as the queue evolves. In some embodiments, tasks are consumed by the worker process from the bottom end of the queue, new tasks (e.g., spawned tasks) are added to the bottom end of the queue, and tasks are stolen from the top end of the queue. It should be understood that the ends from which a particular type of action (e.g., consume, add, steal) is performed can vary, so long as it is consistently done by all worker processes.

As mentioned, each queue corresponds to and/or is defined by a queue object. FIG. 3A illustrates an exemplary embodiment of a queue object Q2, corresponding to the queue q2. The queue object Q2 includes a queue ID and a worker process ID. The queue ID is a unique identifier of the queue, and the worker process ID is a unique identifier of the worker process owning or assigned to the respective queue. For instance, the queue object Q2 is owned by the worker process having a unique ID of "wp-2". This means that the worker process with ID wp-2 is primarily responsible for handling execution of the tasks in the respective queue, absent any re-assignments (e.g., due to stealing by another worker process). Moreover, the queue object Q2 includes the queue data structure (e.g., queue q2).

As described above, the queues and queue objects are stored in a shared memory (e.g., shared memory 102). While the queues (e.g., queues q1, q2) include ordered collections of task objects pending processing or execution by respective worker processes owning those queues, the worker processes are associated with respective running tasks data elements stored in a shared memory (e.g., shared memory 102). For instance, in some embodiments, one worker process is associated with the running task rt1 of FIG. 3A, while another worker process is associated with the running task rt2. Each of the running tasks includes a pointer or reference to a task object being or about to be executed by the respective worker process. For purposes of illustration, in FIG. 3A, the running task rt1 includes a pointer to task object T2, indicating that the worker process associated with running task rt1 is at that time executing the task object T2. Although not illustrated in FIG. 3A, it should be understood that task objects with in a RUNNING, CONTINUATION (or, in some cases, FINISHED) state have at least one pointer thereto stored in one or more of the elements of the queues of the worker processes. This is because, when a task is in a RUNNING, CONTINUATION (or, in some cases, FINISHED) state, at least one of the worker processes is managing that task. As described in further detail below with reference to FIG. 5, when a worker process executes a task (or immediately prior thereto), the worker process copies a pointer to a task object found at the bottom of its queue into its running task slot, advances the bottom index to reflect that a task has been consumed (e.g., moved into a running or executing state), and changes the status of the task object from READY to RUNNING (e.g., using an atomic compare-and-swap operation).

Creating and Executing Tasks in Parallel and Resiliently

Figure 5:
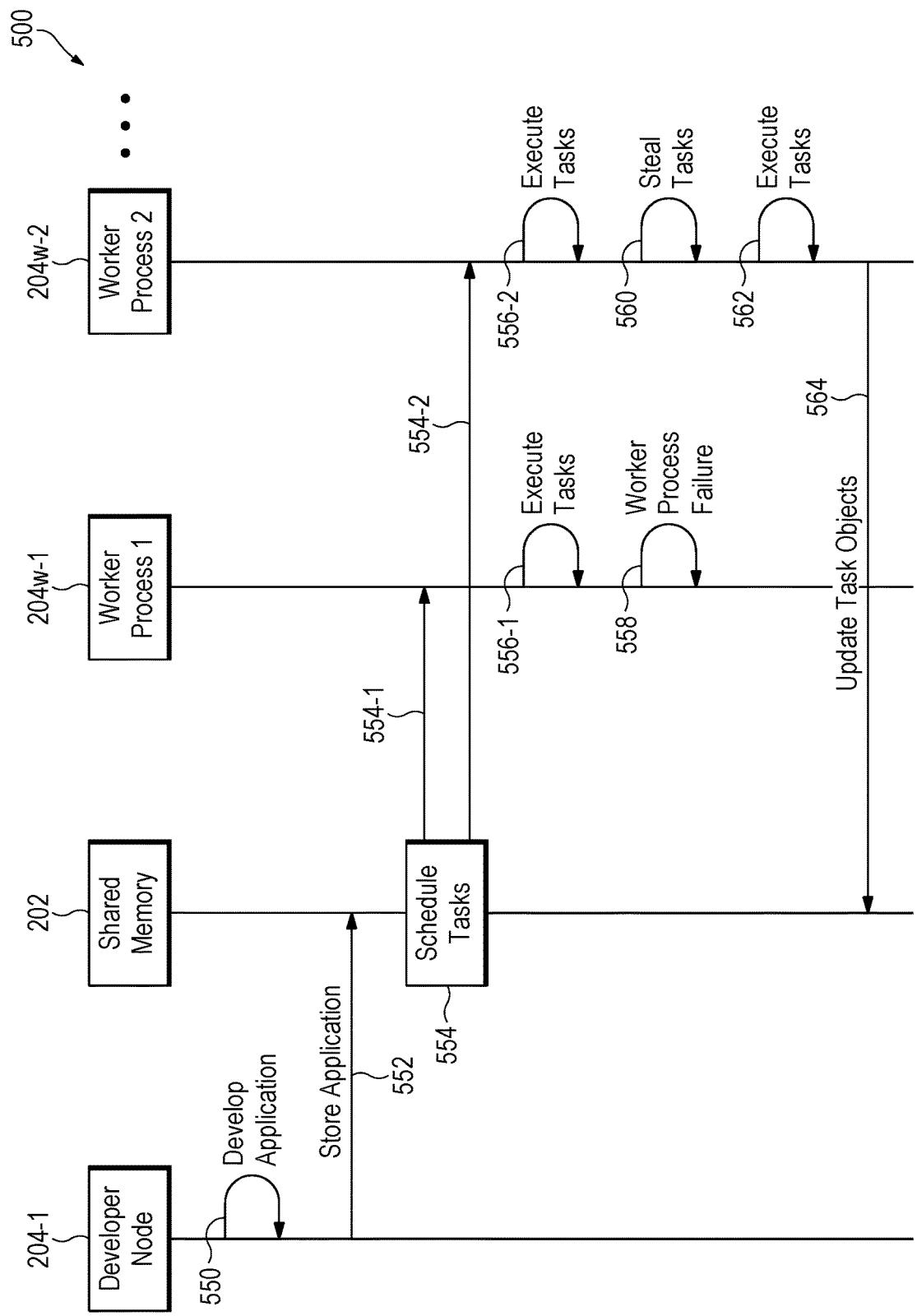
FIG. 5 is a sequence diagram for providing parallel resilient tasks, according to an exemplary embodiment.

FIG. 5 illustrates a sequence diagram 500 for providing parallel resilient tasks, according to an exemplary embodiment. In FIG. 5, exemplary components or actors are provided, including developer node 204-1, shared memory 202, worker process 204w-1, and worker process 204w-2. Although not shown in FIG. 5, the worker process 204w-1 and the worker process 204w-2 can be associated with respective compute nodes and/or the same compute node. As described above, these can be part of a computing environment that includes any number of compute nodes. It should be understood that the steps of the sequence diagram 500 can be combined, divided, and/or performed in varying orders, as known to those of skill in the art, such as to achieve the same functionality.

At step 550, the developer node 204-1 is used (e.g., by a programmer-user) to develop or program a computing application. The developer node 204-1 can be a compute node or another computing device. For example, the developer node 204-1 can be a login or head node used to invoke jobs. As described herein, the programming of the application can include defining one or more tasks and task dependencies. In some embodiments, tasks are defined using a specific task data structure. The code with which the task is defined includes inputs, outputs, functions and/or parameters for executing the task. In some embodiments, tasks can include functions that, when executed, cause sub-tasks or child tasks to be created or spawned. Moreover, as described above with reference to FIG. 4, the dependencies of a task indicate a dependent relationship between the task and one or more other tasks. As further described herein, a task that depends on other tasks is not run or executed until the other tasks on which it depends have been completed.

In turn, the application is transmitted to and stored in the shared memory 202, at step 552. As described above with reference to FIG. 1, the shared memory 202 can be formed of disaggregated memory (or memory devices) interconnected using a fabric and/or other networks that enable atomic operations. In some embodiments, at step 552, the tasks of the application are stored in the shared memory 202 as task objects that define each respective task. Task objects are described above in detail with reference to FIGS. 2 and 3A. Nonetheless, it should be mentioned here for context that each task object includes the task code created during programming of the application, as well as an identification of its dependencies and real-time or most recent status.

In turn, at step 554, the tasks (or task objects) are scheduled, meaning that they are assigned to worker processes for execution. In some embodiments, assigning task objects to worker processes includes copying into queues owned by respective worker processes, pointers or references to each assigned task object stored in the shared memory 202. The queues are stored in the shared memory 202 and are associated with corresponding queue objects in which an identifier of the worker process that owns that queue is stored. In some embodiments, the worker processes each pull newly created task objects into their queues, while in other embodiments, task objects can be assigned to queues of worker processes using a communicatively coupled process or system that is configured to assign task objects to queues of worker processes for execution. Such a process or system can be, for instance, a workload manager service or the development node, which is communicatively coupled to the shared memory and can cause the tasks to be assigned to queues of the worker processes. Tasks that are newly assigned to a queue are added to one end (e.g., bottom) of the queue, as described herein and as known to those of skill in the art. It should be understood that step 554 (including its steps 554-1 and 554-2) is intended to illustrate that unassigned or unscheduled tasks stored in the shared memory 202 are assigned to the worker process 204w-1 and 204w-2. That is, step 554 is not intended to illustrate that the shared memory 202 transmits data to the worker processes 204w-1 or 204w-2, or that the shared memory 202 itself performs the scheduling or assignment of tasks.

In more detail, the task scheduling or assigning of step 554 can include assigning, at step 554-1, tasks to the queue of the worker process 204w-1, and assigning, at step 554-2, tasks to the queue of the worker process 204w-2. As described above, the assigning of tasks at steps 554-1 and 554-2 can be performed by a system or device that is configured to communicate with the shared memory 202 and assign tasks to queues. It should be understood that, in some embodiments, any number of worker processes and/or compute nodes can be used to perform the process of the sequence diagram 500. In such cases, the scheduling of tasks at step 554 can include scheduling tasks not only to worker processes 204w-1 and 204w-2, but to any other available and useable worker process.

In turn, at step 556-1 and 556-2, the worker processes 204w-1 and 204w-2 execute tasks assigned to their respective queues. It should be noted that while the executing steps 556-1 and 556-2 are illustrated and described, in the exemplary embodiment of FIG. 5, as being subsequent to the task scheduling of steps 554-2 and 554-2, task executing can be performed at least partially in parallel with the task scheduling. For instance, once a task or multiple tasks have been added to the queue of a worker process, that worker process can begin to execute the tasks and dynamically spawn additional tasks, adding to its work queue in the manner described above. Moreover, the task executing steps 556-1 and 556-2 of each of the worker processes can refer to the execution of one or more tasks.

Still with reference to steps 556-1 and 556-2, the executing of steps and/or related preceding steps can be performed as follows. The tasks that are scheduled (e.g., assigned to queues) are in a READY state, meaning that the dependencies of these tasks, if any, have been satisfied. As described above, these dependencies are included in the task object that defines the task, and can refer to, for example, other tasks that need to be completed before the dependent task can be put in a READY state. Therefore, tasks that are in a READY state indicate that they are capable of being executed by worker processes, when worker processes are available.

Still with reference to the steps 556-1 and 556-2 of executing tasks, when a worker process is available, it can pull a task for execution. That is, if the worker process is not executing any other tasks, it is deemed to be available. In this regard, the worker copies the pointer or reference to a task object at the bottom of its queue into its running task slot. As described above, the bottom of the queue, from which a task is pulled for execution, can be identified using a bottom index. After a worker process copies the pointer or reference to a task object from the bottom of its queue, it then advances the bottom index (e.g., toward the top of the queue), thereby consuming that task. In turn, the worker process attempts to switch the status of the task, as indicated in the corresponding task object, from READY to RUNNING.

Switching the status of the task can be performed using, for example, a compare-and-swap atomic operation. As described above, atomic operations are enabled by the interconnect (e.g., fabric interconnect, memory-semantic fabric interconnect) and its protocol. As known to those of skill in the art, an atomic compare-and-swap operation is an instruction that compares the contents of a memory location (e.g., the task's status as stored in the task object) to a given value (e.g., READY status) and, if they are the same, modifies the contents of that memory location to a new given value (e.g., RUNNING status). This is done using a single atomic operation which provides synchronization by ensuring that the new value used to modify the status of the task is determined based on the most up-to-date status information. If the compare-and-swap operation returns an indication that it successfully performed the swap or substitution of the state to RUNNING, the worker process finally invokes or runs the code of the task.

When the execution of a task is completed by the respective worker process, the worker process updates the corresponding task object (e.g., similarly to step 564 described in further detail below). Updating the task object can include changing the status in the task object stored in the shared memory 202 from RUNNING to FINISHED. The status can be changed using an atomic compare-and-swap operation or the like.

It should be understood that the above steps or sub-steps can be performed once or more by each of the worker processes 204w-1 and 204w-2, at steps 556-1 and 556-2, respectively, to execute one or more tasks.

A task can fail while being executed by a worker process. In some embodiments, such a failure can be caused by the failure of the worker process executing the task or by its corresponding compute node. For example, in FIG. 5, at step 558, the worker process 204w-1 fails while executing a task. Accordingly, in such cases, fault tolerance can be provided via work stealing and/or work sharing. Work stealing refers to a process in which one work process executes or attempts to execute tasks assigned to other work processes. In embodiments described herein, work stealing can be provided for dynamic load balancing and failure recovery. At step 560 of FIG. 5, the worker process 204w-2 performs a work-stealing operation of a task to recover from the failure, at step 558, of the worker process performing that task. It should of course be understood that the work-stealing of step 558 can be performed for dynamic load balancing rather than failure recovery.

In accordance with the model and framework described herein, work stealing for dynamic load balancing is performed as follows. If a worker process is in an idle state, meaning that it is available (e.g., not executing other tasks and/or not scheduled to execute other tasks), that worker process can steal tasks from other worker processes that have tasks in their queues remaining to be executed. To steal a case, the stealing worker process copies a pointer or reference to the task object of the task being stolen into its running task slot. In some embodiments described herein, when stealing tasks for purposes of dynamic load balancing, the stealing worker process steals the last task in the queue of the other worker process—e.g., the task at the top of the queue, as indicated, for instance, by a top index.

As a result of the stealing worker process copying, into its running task slot, the last task from the queue of the owner worker process, it can be said that two or more memory locations point to the same task object, i.e., (1) the running task slot of the stealing worker process, and (2) a slot in the queue of the owner worker process. In some traditional embodiments, it is possible that the stealing worker process and the owner worker process would execute or attempt to execute the same task (e.g., the stolen task). However, the indirection of the task object (or task descriptor), coupled with the fabric attached memory environment described herein, which enables the use of atomic operations, ensures that the task can only be changed once (and by one worker process) from the READY status to the RUNNING status. That is, if the compare-and-swap operation attempted by one of the worker processes fails, that worker process ignores the task and can move on to the next task in its queue. Therefore, only one of the two conflicting worker processes (e.g., the stealing worker process and the owner worker process) will be able to execute the task, thereby providing exactly-once execution. In some embodiments, the above described work stealing process for dynamic load balancing (or, for any other assistive or supportive purpose (e.g., when new tasks are spawned or otherwise created)) can be performed instead in the context of a work sharing technique or framework, as described in further detail below.

In addition to stealing tasks for purposes of dynamic load balancing, worker processes can steal tasks from another worker process when that other worker process fails. For instance, at step 558 of FIG. 5, the worker process 204w-1 fails. In turn, the worker process 204w-2 can steal one or more tasks from the failed worker process. The process of stealing tasks, which includes copying pointers to task objects, is performed substantially as described above. Notably, in contrast to example embodiments described above such as work stealing for dynamic load balancing, here, the tasks that are assigned or stolen can instead be the task in the running slot of the failing worker and/or at the end of the queue from where the failing, owner worker process consumes tasks for execution (e.g., bottom). In some embodiments, tasks can be stolen from the top end of the queue. It should be understood that the stolen tasks can be assigned to the running slot.

In turn, at step 562, the worker process 204w-2 executes one or more tasks, which, in some embodiments, refers to the tasks stolen from (or shared by) the worker process 204w-1. Execution of the task is performed substantially similarly to the processes described above with reference to steps 556-1 and 556-2. It should be understood that, because the tasks executed at step 562 can refer to the one or more tasks stolen by the worker process 204w-2 from the worker process 204w-1, it is possible that both worker processes point to the same one or more task objects. For instance, at step 562, the running slot of the worker process 204w-2 points to one task, and the running slot of the other worker process 204w-1 points to the same task. If the state of the task prior to or at the time of being stolen is READY, the stealing task 204w-2 can simply switch the state of the task to RUNNING and take over the execution of that task. On the other hand, if the state of the task prior to or at the time of being stolen is RUNNING (e.g., due to the owner worker process failing), the stealing task 204w-2 can simply re-execute the task itself.

Still with reference to FIG. 5, at step 564, the worker process 204w-2 updates the task object of the stolen task executed at step 562. As described above, updating the task object upon completing the execution of a task can include changing the status of the task to FINISHED.

By virtue of the above-described embodiments, when a worker process fails, it is possible to identify the last task being executed by the failing worker process and the state of the tasks at the time of failure. In this regard, the running task slot identifies the last task being executed by the worker process by virtue of the pointer stored therein. As such, other worker processes can assume responsibility for the tasks of the failing worker.

As mentioned above with reference to FIG. 2, in some embodiments, a work sharing configuration can be used to provide resilient task processing. In a work sharing configuration, the shared memory stores a single queue of task objects that can be accessed by all worker processes, rather than one queue for each of the worker processes. Each worker, rather than moving task objects from their respective queues into their respective running task slot, accesses the single shared queue and pulls task objects therefrom—doing so from the same end of the queue (e.g., bottom end), as in the exemplary embodiments described above. The worker processes can continue to pull tasks from the shared queue until those tasks are exhausted.

Worker processes can look for or address apparent failures of other worker processes or compute nodes at predetermined times, time intervals, or based on predetermined rules or thresholds. If a failure or apparent failure is identified by a worker process, that worker process can copy a pointer to the running task object of that apparently failed or failing worker, and execute it in the same manner as described above with reference to FIG. 5.

As described above with reference to FIG. 4, tasks can be dependent on one or more other tasks. Dependence information, which can include information identifying the tasks on which a task depends, can be stored in a task object. For example, in FIG. 4, task t2-1 depends on four other tasks, namely t1-2, t1-3, t1-5, and t1-6. The programming model and framework provided herein can enforce dependencies between or among tasks by identifying, in a fault tolerant manner when all tasks in a group of tasks or a taskset (e.g. FIG. 4, taskset 1) that a continuation task depends on have been completely executed.

That is, in some embodiments, the worker processes executing tasks of a taskset are configured to reach a consensus that they have all finished executing tasks in their queues (e.g., the tasks of the taskset). The worker processes can employ a group barrier to do so. To this end, when each worker process finishes executing the tasks in its own queue (e.g., the tasks of a taskset), they each wait at the group barrier until all other worker processes execute their tasks and reach the group barrier, or until they receive a signal to steal tasks from another worker process, either because a worker process has failed or become overloaded. In turn, when all active (e.g., non-failed) worker processes successfully meet at the barrier, each worker process attempts to move the subsequent continuation task into its respective running task slot. Attempting to move the continuation task into their respective running task slots can be performed using atomic compare and swap operations. The winning worker process—meaning the worker process able to move the continuation task into its running task slot—then executes the continuation task.

Moreover, in some embodiments, the tasks described herein can be configured using work barrier coordination.

Work barrier coordination can be used when a group of worker processes must collectively reach an execution point before they can proceed. To ensure that work processes waiting at the group barrier do not block-wait for a failed work process, a dynamic barrier can be provided. In some embodiments, the dynamic barrier allows group membership to change dynamically, such that active and/or functional worker processes do not need to wait for failed worker processes.

In some embodiments, the dynamic barrier can include one or more of: (1) an array vector where each member (e.g., worker process) is assigned a slot to indicate its participation in the barrier; (2) a 32- or 64-bit monotonically increasing sequence counter indicating membership changes; (3) a 32- or 64-bit counter configured to count the members waiting at the barrier; and (4) a 32- or 64-bit monotonically increasing sequence counter indicating barrier releases. That is, in some embodiments, the sequence counter, member counter, and sequence counter are configured such that they can total 128 bits, such that they can be placed contiguously in a 128-bit word so that they can be modified atomically using a 128-bit compare-and-swap atomic operation.

When joining or leaving a barrier group, a participant increments the membership sequence to indicate the change. A member (worker process) that is detected as failed can be removed from the barrier group and the change is indicated by incrementing the sequence counter. When arriving at a barrier, a member counts the active members, increments the waiting counter, and if the member count matches the waiting count, then it releases the barrier by atomically resetting the waiting count to zero and incrementing the release sequence. Members spin-wait on the barrier by continuously reading the two sequence counters for either changes in membership or barrier release. Upon a membership change detected through the membership sequence change, each waiting member cancels its waiting, allowing it to resume execution. As membership changes may happen upon detection of a failed member, cancelling the waiting enables waiting members to resume execution and help with the execution of tasks previously assigned to the failed member before returning back to the barrier.

The invention claimed is:

1. A system, comprising:
a shared memory comprising memory of one or more memory devices, the one or more memory devices of the shared memory being communicatively coupled with each other and with one or more compute nodes using a fabric interconnect, and the one or more memory devices being disaggregated from the one or more compute nodes; and
the one or more compute nodes, each comprising at least a node processor, the one or more compute nodes being communicatively coupled to the shared memory, and each of the one or more compute nodes including one or more worker processes,
wherein the shared memory is configured to store (1) task objects corresponding to tasks of a first application; (2) queue objects including queues corresponding to each of the worker processes; and (3) running task information corresponding to each of the worker processes;
wherein each of the worker processes is configured to execute one or more tasks of task objects associated with its corresponding queue, and
wherein at least one of the worker processes is configured to execute at least one task of task objects associated with the queue of another one of the worker processes.

2. The system of claim 1,
wherein the one or more compute nodes are configured to be able to access any byte of the shared memory, and
wherein a failure of any of the one or more compute nodes does not cause a failure of the shared memory or of the other compute nodes.

3. The system of claim 1, wherein:
the task objects in the group of task objects define the tasks that form the application;
each of the task objects includes identifiers, a status, and code; and
the code defines one or more of: (1) one or more functions; (2) one or more input pointers and/or output pointers, each of the input and output pointers referencing memory locations in the shared memory; and (3) one or more parameters to be passed to the respective process when the one or more functions are run.

4. The system of claim 3, wherein the application is programmed in accordance with a programming model including methods for communicating with the shared memory and data types, the data types including at least one data structure for defining the task objects.

5. The system of claim 4, wherein, for a first worker process among the worker processes, the executing of the one or more tasks includes:
copying, to the corresponding running task information, a pointer to the task object at the bottom of its respective queue;
executing the one or more functions defined by the code of the task object associated with the running task information, based on an input obtained from the shared memory using the one or more input pointers; and
transmitting an output to the shared memory using the one or more output pointers.

6. The system of claim 5, wherein, for the first worker process among the worker processes, the executing of the one or more tasks also includes:
advancing a corresponding bottom index indicating the bottom of its respective queue; and
changing the status of the one or more tasks in the task objects to RUNNING.

7. The system of claim 5, wherein the first worker process copies into its running task information and executes one task of a task object associated with the queue of a second worker process using a work stealing technique.

8. The system of claim 7, wherein, for the first worker process, the work stealing technique includes at least one of:
(1) when the first worker process is idle, the first worker process copies, to its corresponding running task information, a pointer to the task object at the top of the queue of a second worker process among the worker processes; and
(2) when a third worker process among the worker processes fails, the first worker process copies, to its corresponding running task information, a pointer to the task object in the running task information of the third worker process or associated with the running task information of the third worker process.

9. The system of claim 8, wherein, if the first worker process and the second worker process have, in their respective running task information, pointers to the same task object, the task object is configured such that only one worker process can change its status to RUNNING, thereby causing only one of the first worker process and the second worker process to execute the task of that task object.

10. A method, comprising:
storing, in a shared memory: (1) task objects corresponding to tasks of a first application; (2) a shared queue of objects corresponding to each of a plurality of worker processes, wherein the shared queue is accessible to each of the plurality of worker processes; and (3) running task information corresponding to each of the worker processes,
wherein the shared memory comprises memory of one or more memory devices that are communicatively coupled, via a fabric interconnect, with each other and with the one or more compute nodes associated with the worker processes, and the one or more memory devices being disaggregated from the one or more compute nodes,
accessing, by a first worker process belonging to the plurality of worker processes, the shared que to identify a task associated with a second worker process, wherein the second worker process has failed, and
executing, by the first worker process, at least the task of the task objects associated with the queue of the second worker processes.

11. The method of claim 10,
wherein the one or more compute nodes are configured to be able to access any byte of the shared memory, and
wherein a failure of any of the one or more compute nodes does not cause a failure of the shared memory or of the other compute nodes.

12. The method of claim 10, wherein:
the task objects in the group of task objects define the tasks that form the application;
each of the task objects includes identifiers, a status, and code; and
the code defines one or more of: (1) one or more functions; (2) one or more input pointers and/or output pointers, each of the input and output pointers referencing memory locations in the shared memory; and (3) one or more parameters to be passed to the respective process when the one or more functions are run.

13. The method of claim 12, wherein the application is programmed in accordance with a programming model including methods for communicating with the shared memory and data types, the data types including at least one data structure for defining the task objects.

14. The method of claim 13, wherein, for the first worker process among the worker processes, the executing of the one or more tasks includes:
copying, by the first worker process among the worker processes, to the corresponding running task information, a pointer to the task object at the bottom of its respective queue;
executing the one or more functions defined by the code of the task object associated with the running task information, based on an input obtained from the shared memory using the one or more input pointers; and
transmitting an output to the shared memory using the one or more output pointers.

15. The method of claim 14, wherein, for the first worker process among the worker processes, the executing of the one or more tasks also includes:
advancing a corresponding bottom index indicating the bottom of its respective queue; and
changing the status of the one or more tasks in the task objects to RUNNING.

16. The method of claim 14, wherein the first worker process copies into its running task information and executes one task of a task object associated with the queue of a second worker process using work stealing or work sharing techniques.

17. The method of claim 16, wherein, for the first worker process, the work stealing technique includes at least one of:
(1) when the first worker process is idle, the first worker process copies, to its corresponding running task information, a pointer to the task object at the top of the queue of a second worker process among the worker processes; and
(2) when a third worker process among the worker processes fails, the first worker process copies, to its corresponding running task information, a pointer to the task object in the running task information of the third worker process or associated with the running task information of the third worker process.

18. The method of claim 17, wherein, if the first worker process and the second worker process have, in their respective running task information, pointers to the same task object, the task object is configured such that only one worker process can change its status to RUNNING, thereby causing only one of the first worker process and the second worker process to execute the task of that task object.

19. The method of claim 10, wherein the executing at least the task of the task objects associated with the queue of the task objects comprises:
tracking, during the executing the task, that a group of worker processes among the plurality of worker processes reached a determined point of execution,
wherein the tracking is performed using a dynamic barrier configured to track at least the number of worker processes in the group and the number of worker processes having reached the determined point of execution, and
wherein the dynamic barrier can be dynamically adjusted during the executing of the one or more tasks to reflect a change in the group of worker processes; and
when the number of worker processes in the group and the number of worker processes having reached the determined point of execution match, allowing the group of worker processes to continue the executing of the one or more tasks past the determined point of execution.

20. A system comprising:
a shared memory comprising memory of one or more memory devices, the one or more memory devices of the shared memory being communicatively coupled with each other and with one or more compute nodes using a fabric interconnect, and the one or more memory devices being disaggregated from the one or more compute nodes; and
the one or more compute nodes, each comprising at least a node processor, the one or more compute nodes being communicatively coupled to the shared memory, and each of the one or more compute nodes including one or more worker processes,
wherein the shared memory is configured to store (1) task objects corresponding to tasks of a first application, the task objects being stored in a shared queue; and (2) running task information corresponding to each of the worker processes;
wherein each of the worker processes is configured to execute one or more tasks of task objects from the shared queue, by copying a pointer to one of the tasks objects to be executed next to its running task information and executing the task, and
wherein at least one of the worker processes is configured to execute at least one task of a task object in the running task information of another one of the worker processes.

* * * * *